(12) United States Patent
Kato et al.

(10) Patent No.: US 9,342,745 B2
(45) Date of Patent: May 17, 2016

(54) VEHICLE LIGHT SOURCE DETECTION DEVICE, LIGHT BEAM CONTROL DEVICE AND PROGRAM OF DETECTING VEHICLE LIGHT SOURCE

(71) Applicant: DENSO CORPORATION, Kariya, Aichi-pref. (JP)

(72) Inventors: Kenji Kato, Kariya (JP); Raise Mori, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 425 days.

(21) Appl. No.: 13/922,519

(22) Filed: Jun. 20, 2013

(65) Prior Publication Data
US 2014/0029792 A1    Jan. 30, 2014

(30) Foreign Application Priority Data
Jul. 25, 2012    (JP) ................. 2012-164974

(51) Int. Cl.
| | |
|---|---|
| *G06K 9/00* | (2006.01) |
| *B60Q 1/08* | (2006.01) |
| *B60Q 1/14* | (2006.01) |

(52) U.S. Cl.
CPC .............. *G06K 9/00791* (2013.01); *B60Q 1/08* (2013.01); *B60Q 1/143* (2013.01); *G06K 9/00825* (2013.01); *B60Q 2300/324* (2013.01); *B60Q 2300/42* (2013.01)

(58) Field of Classification Search
None
See application file for complete search history.

(56) References Cited

U.S. PATENT DOCUMENTS

| | | | | |
|---|---|---|---|---|
| 2004/0143380 A1* | 7/2004 | Stam | ...................... | B60Q 1/085 701/36 |
| 2007/0253597 A1* | 11/2007 | Utida | ..................... | B60Q 1/085 382/104 |
| 2008/0062010 A1* | 3/2008 | Kobayashi | ......... | G06K 9/00798 340/937 |
| 2009/0010494 A1* | 1/2009 | Bechtel | ................ | B60Q 1/1423 382/104 |
| 2009/0021581 A1* | 1/2009 | Sun | ..................... | G06K 9/00825 348/148 |

(Continued)

FOREIGN PATENT DOCUMENTS

| | | |
|---|---|---|
| JP | 07-172232 | 7/1995 |
| JP | 2007-293688 | 11/2007 |

(Continued)

OTHER PUBLICATIONS

Office Action dated Jul. 1, 2014 in corresponding Japanese Application No. 2012-164974.

*Primary Examiner* — Jayesh A Patel
*Assistant Examiner* — Geoffrey E Summers
(74) *Attorney, Agent, or Firm* — Harness, Dickey & Pierce, P.L.C.

(57) ABSTRACT

A vehicle light source detection device in a light beam control system detects a position of a light source appeared and detected in captured image data. The device calculates a gradient of a road on which the own vehicle is running. The vehicle light source detection device estimates a vanishing point in the captured image data on the basis of the detected gradient of the road. The device further increases a reliability value of the detected light source when the point of the detected light source more approaches the vanishing point. When the reliability value of the detected light source is not less than a predetermined reference value, the device determines that the detected light source is a head lamp of an oncoming vehicle, and adjusts an irradiation range of the light beam of the head lamps of the own vehicle to avoid the oncoming vehicle.

9 Claims, 5 Drawing Sheets

(56) References Cited

U.S. PATENT DOCUMENTS

2010/0134011 A1* 6/2010 Kobayashi .............. B60Q 1/085
                                                              315/82
2012/0327188 A1* 12/2012 Takemura .......... G06K 9/00798
                                                              348/46

FOREIGN PATENT DOCUMENTS

| JP | 2008-067086 | 3/2008 | |
| JP | 2009-255639 | 11/2009 | |
| JP | WO 2011114547 A1 * | 9/2011 | ......... G06K 9/00798 |
| JP | 2011-253222 | 12/2011 | |

* cited by examiner

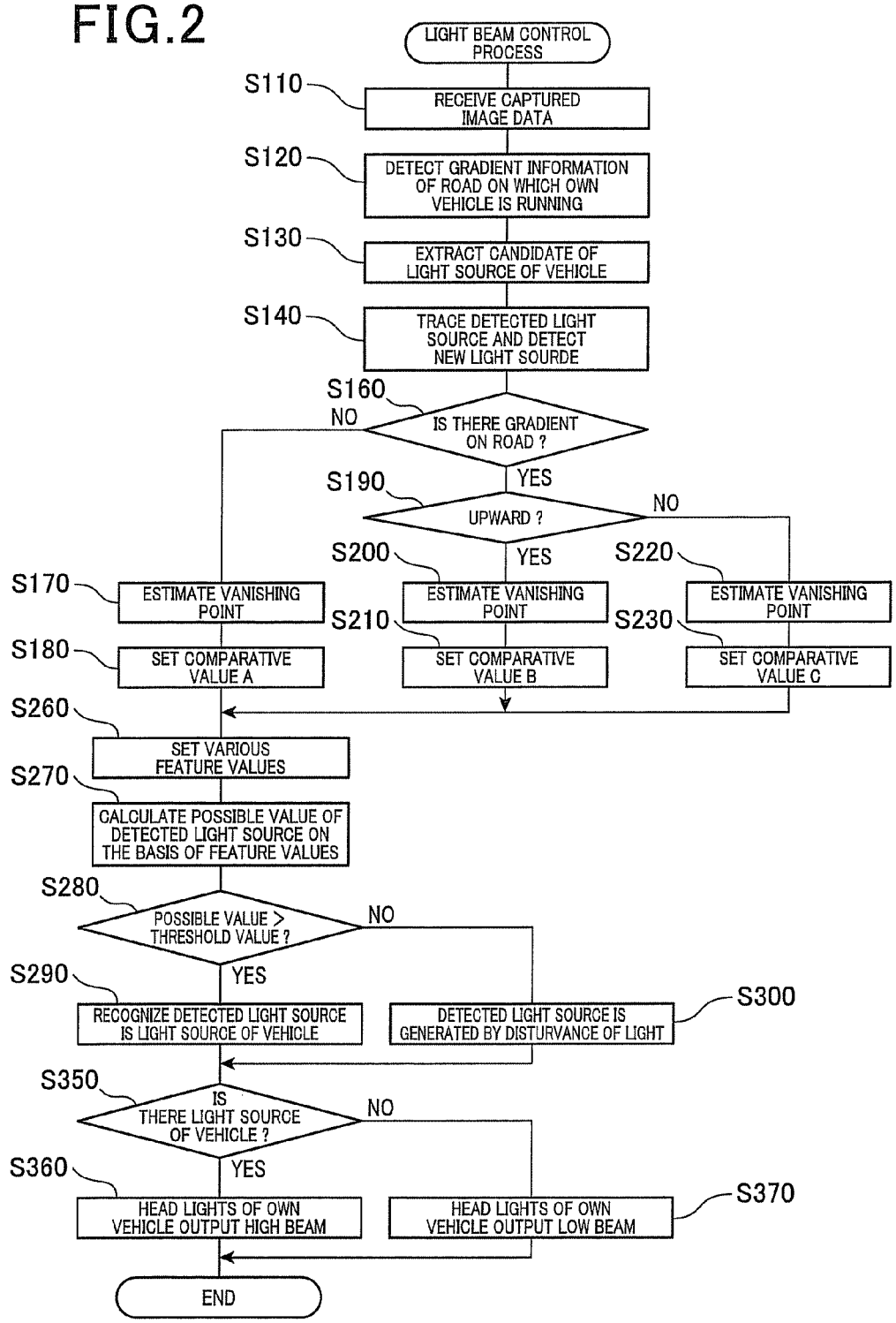

ROAD WITHOUT GRADE

ROAD WITH GRADE (UPHILL)

ONCOMING VEHICLE          OWN VEHICLE

ROAD WITH GRADE (DOWNHILL)

DOWNHILL ROAD    WHITE CENTER LINE

ONCOMING VEHICLE                OWN VEHICLE

VEHICLE LIGHT SOURCE DETECTION DEVICE, LIGHT BEAM CONTROL DEVICE AND PROGRAM OF DETECTING VEHICLE LIGHT SOURCE

CROSS-REFERENCE TO RELATED APPLICATION

This application is related to and claims priority from Japanese Patent Application No. 2012-164974 filed on Jul. 25, 2012, the contents of which are hereby incorporated by reference.

BACKGROUND OF THE INVENTION

1. Field of the Invention

The present invention relates to vehicle light source detection devices, light beam control devices and programs for detecting light sources such as head lamps of vehicle in captured image.

2. Description of the Related Art

There have been known conventional vehicle light source detection devices capable of photographing an area in front of an own vehicle and detecting one or more light sources such as head lamps of vehicles in the captured front image data. The conventional vehicle light source detection devices trace the detected light sources on the basis of a movement of the detected light sources, and whether or not the detected light sources form a pair. For example, Japanese registered patent No. 4697101 has disclosed such a conventional technique.

However, it needs a long time for the conventional vehicle light source detection device having the above structure to recognize the presence of a pair of light sources such as head lamps of a vehicle. That is, it needs a long time for the conventional vehicle light source detection device to correctly detect light sources such as head lamps of a vehicle.

SUMMARY

It is therefore desired to provide a vehicle light source detection device, a light beam control device and a program for quickly detecting a light source such as a head lamp of a vehicle on the basis of captured image data with high accuracy.

An exemplary embodiment provides a vehicle light source detection device mounted to an own vehicle configured to detect a light source of a vehicle in captured image data. The vehicle light source detection device is comprised of a light source appearance detection section, a gradient calculation section, a vanishing point estimation section, a reliability value calculation section and a light source detection section. The light source appearance detection section detects a presence of a light source detected in captured image data. The gradient calculation section calculates a gradient of a road on which the own vehicle is running. The vanishing point estimation section estimates a vanishing point in the captured image data on the basis of at least the detected gradient of the road. The reliability value calculation section more increases a magnitude of a reliability value of the detected light source when a position of the detected light source more approaches to the vanishing point in the captured image data. The reliability value of the detected light source indicates a probability that the detected light source is a light source of a vehicle. The light source detection section determines that the detected light source is a light source of a vehicle when the reliability value of the detected light source is not less than a predetermined reference value.

Because the vehicle light source detection device having the above structure estimates the vanishing point in the captured image on the basis of a detected gradient of a road on which the own vehicle is running, and estimates a reliability value of the detected light source on the basis of the point of the detected light source in the captured image data, it is possible to quickly detect whether or not the detected light source is a light source such as head lamps of a vehicle with high accuracy.

Further, it is possible for the vehicle lamp detection device to estimate the vanishing point in captured image data by using a map which includes vehicle movement information such as an steering angle and a yaw rate, an extending direction of a boundary line such as a white center line on a road, and uneven surface information of a road in addition to information of a gradient of the road. It is also possible to calculate a gradient of the road on the basis of a value detected from a tilt of the own vehicle, and map data.

It is further possible to use a light beam control device and a microcomputer equipped with a memory section for storing one or more programs with which the functions of the vehicle light source detection device are realized. In this structure, a central processing unit in the microcomputer reads the program stored in the memory section and executes the programs. The microcomputer transmits a control signal to the light beam control device in order to adjust the irradiation range of the light beam of the light source such as head lamps of the own vehicle so that the irradiation range of the light beam can avoid the detected light source of the vehicle such as an oncoming vehicle on the road on which the own vehicle is running. Still further, when the light source appearance detection section is configured to trace a light source detected in the captured image data, the vehicle light source detection device recited in the claims can detect whether or not the detected light source is a light source of a vehicle such as an oncoming vehicle on the road on which the own vehicle is running.

BRIEF DESCRIPTION OF THE DRAWINGS

A preferred, non-limiting embodiment of the present invention will be described by way of example with reference to the accompanying drawings, in which:

FIG. 2 is a flow chart showing a light beam control process executed by the processing section 10 and the light beam control section 30 in the light beam control system 1 according to the exemplary embodiment of the present invention;

DETAILED DESCRIPTION OF THE PREFERRED EMBODIMENTS

Figure 1:
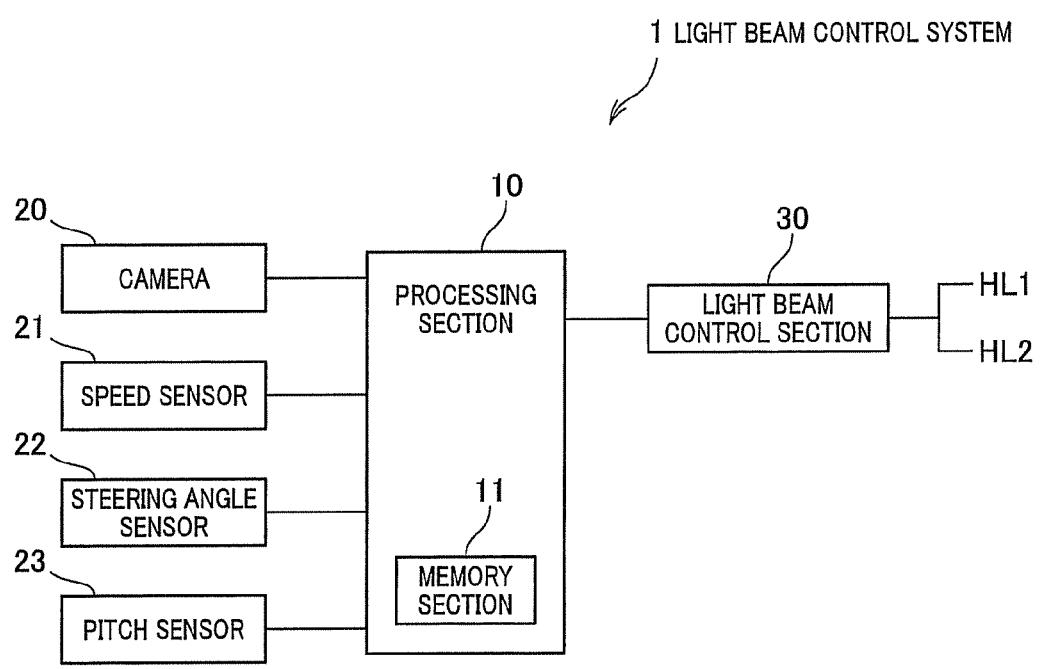
FIG. 1 is a block diagram showing a schematic structure of a light beam control system 1 comprised of a processing section 10 as a vehicle light source detection device and a light beam control section 30 as a light beam control device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a light beam control system 1 comprised of a processing section 10 as a vehicle light source detection device, a light beam control section 30 as a light beam control device, and a program for detecting light sources such as head lamps of a vehicle according to an exemplary embodiment with reference to FIG. 1 to FIG. 5A and FIG. 5B.

(Structure)

FIG. 1 is a block diagram showing a schematic structure of the light beam control system 1 comprised of the processing section 10 and the light beam control section 30 according to the exemplary embodiment.

The light beam control system 1 shown in FIG. 1 is mounted to various types of vehicles such as passenger vehicles. When one or more vehicles are running around an own vehicle equipped with the light beam control system 1, the light beam control system 1 switches an optical axis of head lamps of the own vehicle to a low beam. In other words, when the light beam of the head lamps of the own vehicle dazzles a driver of an oncoming vehicle, the light beam control system 1 switches the light beam of the head lamps to a low beam in order to avoid the driver of the oncoming vehicle from being dazzled.

In more detail, as shown in FIG. 1, the light beam control system 1 is comprised of the processing section 10, a camera 20, a speed sensor 21, a steering angle sensor 22, a pitch sensor 23, the light beam control section 30 and a pair of head lamps HL1 and HL2. The camera 20 is mounted to a vehicle so that the camera 20 scans a front area in front of the own vehicle within a predetermined irradiation area of head lamps HL1 and HL2 of the own vehicle in a forward direction to which the own vehicle moves. That is, the camera 20 is a color camera capable of photographing color image of the front area in the movement direction of the own vehicle. The camera 20 transmits captured image data to the processing section 10.

The speed sensor 21 and the steering angle sensor 22 have a known structure and are used to estimate a movement direction of the own vehicle. The speed sensor 21 and the steering angle sensor 22 transmit detection signals which indicate detection results to the processing section 10.

For example, the pitch sensor 23 is comprised of a vehicle height sensor or a pitching sensor. A vehicle height sensor is arranged near to front wheels or rear wheels of a vehicle and measures a height of the vehicle. A pitching sensor measures a pitching of a vehicle. The pitching sensor 23 generates and transmits detection signals as the detection results to the processing section 10.

The processing section 10 detects light sources such as head lamps of vehicles on the basis of the image data (or front image data) and information transmitted from the speed sensor 21, the steering angle sensor 22 and the pitch sensor 23, etc. The light beam control section 30 adjusts a direction of an optical axis of the head lamps HL1 and HL2 of the own vehicle (namely, adjusts the direction of light beam of the head lamps of the own vehicle) on the basis of the detection signals transmitted from the processing section 10. In a concrete example, the light beam control section 30 switches the light beam of the head lamps HL1 and HL2 of the own vehicle to a high beam and a low beam. It is possible for the light beam control section 30 to have a structure in which an optical axis of light beam of the head lamps HL1 and HL2 of the own vehicle is changed to a direction, toward which no vehicle is present, for example to a left side (or right side), or a part of the head lamp is closed by a shutter mechanism.

The processing section 10 is comprised of a central processing unit (CPU) and a memory section 11. The memory section 11 is comprised of various types of memories such as a read only memory (ROM) and a random access memory (RAM). The CPU in the processing section 10 reads one or more programs stored in the memory section 11. The CPU executes the program read out from the memory section 11 in order to detect light sources such as head lamps of vehicles on the road on which the own vehicle is running. For example, the memory section 11 stores parameter data of light sources such as head lamps and tail lamps other than data of vehicles. The parameter data of light sources indicate features of various types of lamps of vehicles, for example a size, a color, a dimension such as a height and a wide, a distance between a pair of lamps, a light movement of a lamp, etc. The CPU in the processing section 10 selects a light source as a lamp of a vehicle from various types of light sources in the captured image and identifies that the lamp is a vehicle lamp on the basis of the parameter data stored in the memory section 11.

(Beam Control Process)

FIG. 2 is a flow chart showing a light beam control process executed by the processing section 10 and the light beam control section 30 in the light beam control system 1 according to the exemplary embodiment.

The light beam control process identifies a light source of a vehicle which indicates a lamp of a vehicle in captured image data, and adjusts a direction of an optical axis (or a direction of beam light) of head lamps HL1 and HL2 of the own vehicle on the basis of the identified vehicle lamp.

The light beam control process is started when the electric power of the own vehicle is turned on. The light beam control process is executed repeatedly every predetermined time intervals, every 100 ms, for example.

A description will now be given of the light beam control process with reference to FIG. 2.

In step S110, the camera 20 sequentially photographs front image of the own vehicle and transmits captured image data (frames of image data) to the processing section 10. The operation flow goes to step S120.

In step S120, the processing section 10 receives detection signals transmitted from the pitch sensor 23 in order to detect gradient information of the road on which the own vehicle is running. The operation flow goes to step S130.

In step S130, the processing section 10 detects a candidate of light source of a vehicle (such as an oncoming vehicle) in the captured image data. That is, the processing section 10 extracts a smallest rectangle area, which includes a whole area of the candidate of the vehicle light source, from the captured image data. A label (which indicates an identified number) is assigned to the extracted rectangle area. The more the size of the detected vehicle light source is increased, the more the area of the extracted rectangle area is increased. The operation flow goes to step S140.

In step S140, the processing section 10 traces the detected light source in the captured image data, and recognizes the same light source whether or not the detected light source is moved within a predetermined area in captured image data (frames) which are sequentially captured by the camera 20. The predetermined area is determined in advance in consideration of a movable distance of the own vehicle for a predetermined length of time in sequentially captured image data. When the light source is detected within the predetermined area in newly captured image data (as a new frame), the processing section 10 recognizes that the detected light source belongs to the previously detected vehicle. On the other hand, when a new light source is detected out of the predetermined area in newly captured image data, the processing section 10 recognizes that the newly detected light source belongs to another vehicle. The operation flow goes to step S160.

In step S160, the processing section 10 detects whether or not there is a gradient (or a slope) of the road on which the own vehicle is running on the basis of the gradient information obtained in step S120. When the detection results in step S160 indicates negation ("NO" in step S160), namely when the gradient information obtained in step S120 detects that there is no gradient in the road on which the own vehicle, is running, the operation flow goes to step S170.

In step S170, the processing section 10 estimates a vanishing point in the captured image data when there is no gradient on the road on which the own vehicle is running.

Figure 3A:
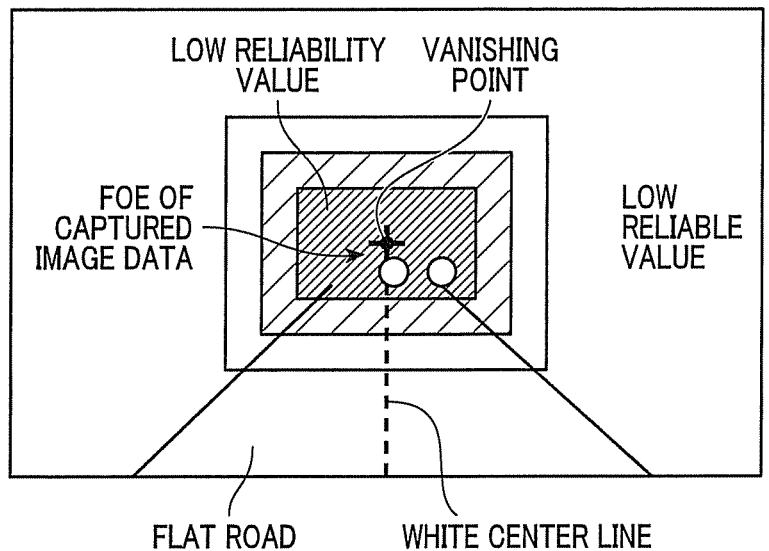
FIG. 3A is a view showing captured image in front of an own vehicle detected by a camera 20 when a road on which the own vehicle and an oncoming vehicle are running is a flat road.
Figure 3B:
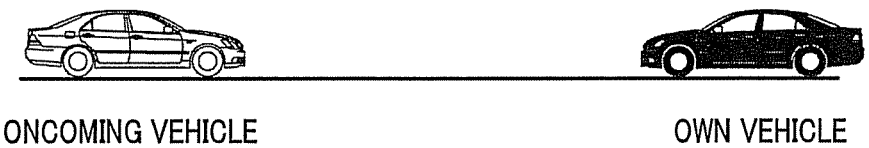
FIG. 3B is a view showing a relationship in position between the own vehicle and the oncoming vehicle on the flat road.

FIG. 3A is a view showing captured image (one frame) in front of the own vehicle detected by a camera 20 when a road on which the own vehicle and an oncoming vehicle are running is a flat road. FIG. 3B is a view showing a relationship in position between the own vehicle and the oncoming vehicle on the flat road.

In step S170 as shown in FIG. 3A, a predetermined focus of expansion (FOE) becomes equals to the vanishing point in the captured image data when the road has no gradient (or no slope), on which the own vehicle is running. When there are the own vehicle and the oncoming vehicle in the captured image data shown in FIG. 3A, a positional relation between the own vehicle and the oncoming vehicle is shown in FIG. 3B. The operation flow goes to step S180.

In step S180, the processing section 10 selects a comparative value A when the road has a flat road without a gradient. The comparative value A is a dedicated threshold value when there is no gradient on a road or determined by using a map. The comparative value A is determined by using a map which shows a relationship between a position, in the captured image data and a reliability value which indicates a probability that a light source is a vehicle lamp in the captured image data.

In this map, a light source detected within an area close to the vanishing point in the captured image data has a maximum reliability value. That is, the more the position of the detected light source is apart from the vanishing point in the captured image data, the more a magnitude of the reliability value of the detected light source is decreased. The processing section 10 uses this map in order to determine a probability of a light source of a vehicle according to a position of the light source detected in the captured image data.

The comparative value A includes a threshold value for a moving speed and a movement direction of a light source near the vanishing point immediately after the light source is appeared in the captured image data. The moving speed of a light source is determined within a detection speed range between an upper limit speed and a lower limit speed of a vehicle. That is, when the moving speed of the light source detected in the captured image data is out of the detection speed range, the processing section 10 decreases the reliability value of the light source as compared with a reliability value of a light source having a moving speed within the detection speed range.

When the detected light source moves upward immediately after the light source is appeared in the captured image data (for example within three frames of the captured image data), the processing section 10 decreases the reliability value of the detected light source as compared with a reliability value of a light source which moves downward in the captured image data. The operation flow goes to step S260. The operation in step S260 will be explained in detail later.

On the other hand, when the detection result in step S160 indicates affirmation ("YES" in step S160), namely, when the gradient information obtained in step S120 detects the presence of a gradient of the road on which the own vehicle is running, the operation flow goes to step S190. In step S190, the processing section 10 detects whether or not the road on which the own vehicle is running is an uphill road. When the detection results in step S190 indicates affirmation ("YES" in step S190), namely indicates that the road is an uphill road, the operation flow goes to step S200. In step S200, the processing section 10 estimates a position of a vanishing point corresponding to a gradient of the uphill road in the captured image data.

Figure 4A:
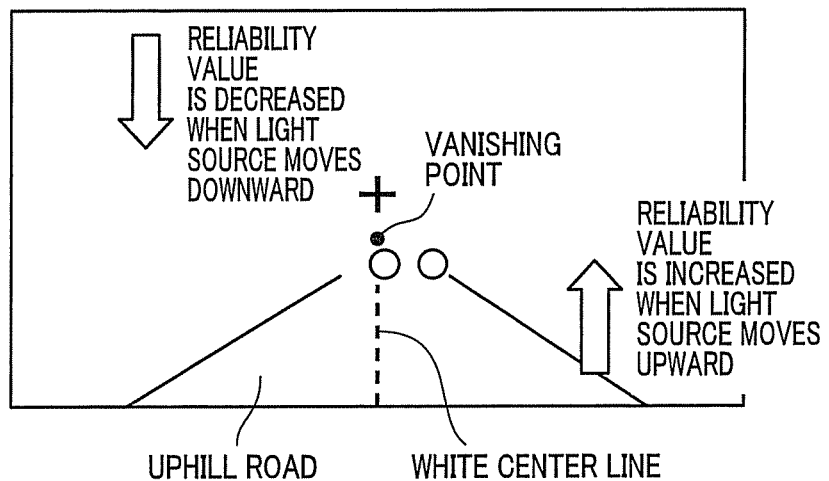
FIG. 4A is a view showing captured image in front of the own vehicle detected by the camera 20 when a road on which the own vehicle and an oncoming vehicle are running is an uphill road.
Figure 4B:
FIG. 4B is a view showing a relationship in position between the own vehicle and the oncoming vehicle on the uphill road.

FIG. 4A is a view showing captured image in front of the own vehicle detected by the camera 20 when a road on which the own vehicle and an oncoming vehicle are running is an uphill road. FIG. 4B is a view showing a relationship in position between the own vehicle and the oncoming vehicle on the uphill road.

As shown in FIG. 4A, when the gradient of the uphill road is increased, the vanishing point is set to a position which is lower than a predetermined focus of expansion (FOP) in the captured image. In addition, when an oncoming vehicle is running on the uphill road on which the own vehicle is also running, the relationship on the uphill road between the own vehicle and the oncoming vehicle is shown in FIG. 4B, for example. The operation flow goes to step S210.

In step S210, the processing section 10 determines a comparative value B which is a value when the road on which the own vehicle is running is an uphill road. The comparative value B is a specified threshold value and a map to be used when the road is an uphill road. The comparative value B includes the map, as previously described, which shows a relationship between a position on the captured map data and a reliability value of a light source of a vehicle due to a position of the light source in the captured image data.

In the map as previously described, a magnitude of the reliability value of a light source of a vehicle at a position within an area close to the vanishing point has a maximum value. The reliability value of a light source of a vehicle is more decreased when the position in the captured image data is more apart from the vanishing point. The reliability value of a light source of a vehicle is determined on the basis of the vanishing point in the captured image data which corresponds to an uphill road having a gradient or a slope.

In addition, although the processing section 10 uses the detection speed range as the comparative value B, this detection speed range is set to be lower than a detection speed range when a road does not have a gradient. In other words, a detection speed upper-limit range and a detection speed lower-limit range are set to be lower than those when the road does not have a gradient.

The processing section 10 does not decrease the reliability value of a light source of a vehicle even if the light source moves upward in the captured image data immediately after the light source is appeared in the captured image data. In fact, when a road is an uphill road, there is a tendency that the light source of a vehicle slightly moves upward and then moves downward in the captured image data. When the operation in step S210 is completed, the operation flow goes to step S260.

On the other hand, when the detection results in step S190 indicates negation ("NO" in step S190), namely indicates that the road is a downhill road, the operation flow goes to step S220. In step S220, the processing section 10 estimates a position of a vanishing point corresponding to a gradient of the downhill road in the captured image data.

Figure 5A:
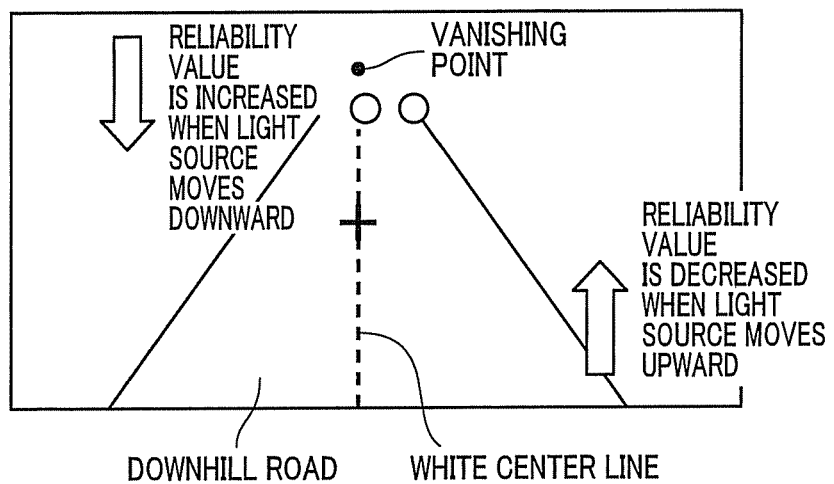
FIG. 5A is a view showing captured image in front of the own vehicle detected by the camera 20 when a road on which the own vehicle and an oncoming vehicle is running is a downhill road.
Figure 5B:
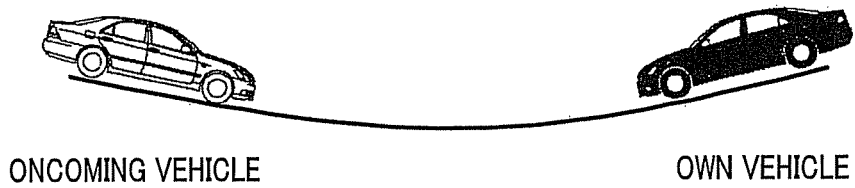
FIG. 5B is a view showing a relationship in position between the own vehicle and the oncoming vehicle on the downhill road.

FIG. 5A is a view showing captured image in front of the own vehicle detected by the camera 20 when a road on which the own vehicle and an oncoming vehicle is running is a downhill road. FIG. 5B is a view showing a relationship in position between the own vehicle and the oncoming vehicle on the downhill road.

As shown in FIG. 5A, when the gradient of the downhill road is increased, the vanishing point is set to a position which is higher than a predetermined focus of expansion (FOP) in the captured image. In addition, when there is an oncoming vehicle is running on the downhill road on which the own vehicle is running, the relationship between the own vehicle and the oncoming vehicle on the downhill road is shown in FIG. 5B, for example. The operation flow goes to step S230.

In step S230, the processing section 10 determines a comparative value C to be used when the road on which the own vehicle is running is a downhill road. The comparative value C is a specified threshold value and a map to be used when the road is a downhill road.

The comparative value C includes the map which shows a relationship between a position in the captured image data and a reliability value of a light source of a vehicle. Similar to the map when the road is an uphill road as previously described, the reliability value of a light source of a vehicle is determined on the basis of the vanishing point which corresponds to a downhill road. Although the processing section 10 uses the detection speed range as previously described, this detection speed range is set to be higher than a detection speed range when a road does not have a gradient. In other words, a detection speed upper-limit range and a detection speed lower-limit range, when the road is a downhill road, are set to be higher than those when the road is a flat road without a slope (a gradient).

The processing section 10 decreases a magnitude of the reliability value of a light source of a vehicle when the light source moves upward in the captured image data, as compared with a magnitude of the reliability value of a light source of a vehicle when the light source moves downward in the captured image data, immediately after the light source is appeared in the captured image data. The processing section 10 sets the reliability value obtained above into the memory section 11. When the operation in step S230 is completed, the operation flow goes to step S260.

In step S260, the processing section 10 calculates various feature values of a light source of a vehicle. The processing section 10 calculates as the feature values a stationary image level feature value, a pair feature value, an appearance feature value, and a series feature value. The processing section 10 executes the process in step S260, a process in step S270, a process in step S280, a process in step S290, and a process in step S300 per each of light sources detected in the captured image data.

The stationary image level feature value indicates a feature value regarding a color of light emitted from a light source and a shape of the light source. The pair feature values indicates a feature value due to a relationship between a light source and another light source which is present in a horizontal direction in the captured image data. The appearance feature value indicates a feature value on the basis of a position at which the detected light source appears in the captured image data. The series of feature values indicates a feature value obtained by tracing a light source in the captured image data. The processing section 10 determines these feature values on the basis of reliability values corresponding to the reference values (as comparative values) regarding colors and shapes of light sources stored in the memory section 11.

In particular, the processing section 10 calculates the appearance feature value of a light source detected in the captured image data in step S140, on the basis of the position of the light source appeared in the captured image data by referring the map. This map, as previously explained, shows a relationship between a position in the captured image data and a reliability value of a light source of a vehicle.

In addition, the process of calculating the series feature value includes a process of calculating a feature value on the basis of a movement direction and a moving speed of a light source in the captured image data immediately after the light source is appeared in the captured image data.

The operation flow goes to step S270. In step S270, the processing section 10 calculates a possible value of the detected light source on the basis of the plural feature values. The possible value of the detected light source indicates a possibility that the detected light source is a light source of a vehicle such as a head lamp of a vehicle. That is, the processing section 10 calculates a weighted average of the feature values in order to obtain the possible value of the detected light source. It is also possible for the processing section 10 to use each of the feature values and a possible value of a light source which are determined experimentally in advance and stored in the memory section 11. The operation flow goes to step S280.

In step S280, the processing section 10 compares the possible value of the detected light source calculated in step S270 with a predetermined threshold value. When the comparison result in step S280 indicates affirmation ("YES" in step S280), namely indicates that the possible value of the detected light source calculated in step S270 is not less than the predetermined threshold value, the operation flow goes to step S290. In step S290, the processing section 10 determines and recognizes that the detected light source is a light source of a vehicle. The processing section 10 stores the result in step S290 into the memory section 11. The operation flow goes to step S350.

On the other hand, when the comparison result in step S280 indicates negation ("NO" in step S280), namely indicates that the possible value of the detected light source calculated in step S270 is less than the predetermined threshold value, the operation flow goes to step S300. In step S300, the processing section 10 determines that the detected light source is generated by disturbance of light. The processing section 10 stores the result in step S300 into the memory section 11. The operation flow goes to step S350.

In step S350, the processing section 10 detects whether or not a light source of a vehicle is detected in the captured image data. When the detection result in step S350 indicates affirmation ("YES" in step S350), the operation flow goes to step S360. In step S360, the processing section 10 generates and transmits an instruction to the light beam control section 30 in order to switch to a low beam of the head lamps HL1 and HL2 of the own vehicle.

On the other hand, when the detection result in step S350 indicates negation ("NO" in step S350), the operation flow goes to step S370. In step S370, the processing section 10 generates and transmits an instruction to the light beam control section 30 in order to switch the head lamps HL1 and HL2 of the own vehicle to a high beam. The processing section 10 completes the light beam control process shown in FIG. 2.

(Effects)

As previously described in detail, the processing section 10 detects a light source in the captured image data, and calculates a gradient (or a slope) of the road on which the own vehicle is running, where the own vehicle is equipped with the light beam control system 1 having the processing section 10 as the vehicle light source detection device according to the exemplary embodiment. The processing section 10 estimates a vanishing point in the captured image data on the basis of at least the gradient of the road on which the own vehicle is running. Further, the processing section 10 increases more a reliability value of a light source of a vehicle when the position of the appeared light source more approaches to the vanishing point in the captured image data. When the reliability value of the light source is not less than the predetermined threshold value, the processing section 10 determines that the light source detected in the captured image data is a light source of a vehicle.

According to the light beam control system 1 comprised of the processing section 10 as the vehicle light source detection device having the structure previously described, a vanishing point is estimated on the basis of a gradient of a road on which the own vehicle is running, and the reliability value of the light source is determined on the basis of the position of the light source appeared in the captured image data. This makes it possible to speedy detect that the detected light source is a light source of a vehicle with high accuracy.

Further, the processing section 10 in the light beam control system 1 traces the position of a light source detected in the captured image data, and calculates a reliability value of the light source on the basis of a gradient of a road on which the own vehicle is running and a moving speed of the light source detected in the captured image data. That is, the light beam control system 1 detects a light source of a vehicle such as head lamps of a vehicle on the basis of the feature in which a moving speed of the detected light source depends on a gradient of the road on which the own vehicle is running.

It is possible for the light beam control system 1 to detect the light source such as head lamps of a vehicle with high accuracy on the basis of the gradient (or a slope) of a road on which the own vehicle is running and the moving speed of a light source detected in the captured image data. More specifically, the processing section 10 decreases the reliability value of a light source when a moving speed of the light source detected in the captured image data is less than the predetermined lower limit speed of the vehicle, as compared with when the moving speed of the light source detected in the captured image data is not less than the predetermined lower limit speed of the vehicle. In addition, when the road on which the own vehicle is running is an uphill road, the processing section 10 more decreases at least the predetermined lower limit speed of the vehicle.

Still further, the processing section 10 decreases the reliability value of a light source when a moving speed of the light source detected in the captured image data exceeds the predetermined upper limit speed of the vehicle, as compared with when the moving speed of the light source detected in the captured image data is not more than the predetermined upper limit speed of the vehicle. In addition, when the road on which the own vehicle is running is a downhill road, the processing section 10 more increases at least the predetermined upper limit speed of the vehicle.

That is, when the road on which the own vehicle is running is an uphill road, there is a tendency that the moving speed of the light source of a vehicle is decreased after the light source appears in the captured image data, as compared with the moving speed of the light source when the road has no gradient, namely no slope.

Further, when the road on which the own vehicle is running is a downhill road, there is a tendency that the moving speed of the light source of a vehicle is increased after the light source appears in the captured image data, as compared with the moving speed of the light source when the road has no gradient, namely no slope. The processing section 10 as the vehicle lamp detection device in the light beam control system 1 according to the exemplary embodiment uses the reliability value of a light source in order to clearly distinguish the light source of a vehicle from other light sources and to avoid an error detection of the detected light source. The reliability value of a light source indicates a probability of a light source of a vehicle. The reliability value of a light source indicates a probability that the detected light source is a light source of a vehicle on the basis of the plural feature values.

According to the light beam control system 1 having the structure previously described, it is possible to increase the detection accuracy for detecting light sources such as head lamps of a vehicle immediately after the light source appears in the captured image data. In addition, the processing section 10 in the light beam control system 1 traces the position of a light source in the captured image data and calculates the reliability value of a light source of a vehicle on the basis of a gradient of the road on which the own vehicle is running and the moving direction of a light source detected in the captured image data.

Specifically, when the road is an uphill road, the processing section 10 more decreases the reliability value of a light source which indicates a possibility that the detected light source is a light source such as a head lamp of a vehicle when the detected light source moves downward in the captured image data. Further, the processing section 10 increases the reliability value of a light source which indicates a possibility that the detected light source is a light source such as a head lamp of a vehicle when the detected light source moves upward in the captured image data.

Still further, when the road is a downhill road, the processing section 10 more increases the reliability value of a light source which indicates a possibility that the detected light source is a light source such as a head lamp of a vehicle when the detected light source moves downward in the captured image data. Further, the processing section 10 more decreases the reliability value of a light source which indicates a possibility that the detected light source is a light source such as a head lamp of a vehicle when the detected light source moves upward in the captured image data.

According to the light beam control system 1 having the structure previously described, it is possible to quickly detect a presence of a light source such as head lamps of a vehicle in the captured image data.

(Other Modifications)

The scope of the present invention is not limited by the exemplary embodiment previously described. For example, it is possible for the present invention to have various modifications.

For example, it is possible for the processing section 10 as the vehicle lamp detection device to estimate the vanishing point in captured image data by using a map which includes vehicle movement information such as a steering angle and a yaw rate, an extending direction of a boundary line such as a white center line on a road, and uneven information of a road in addition to information of a gradient of the road. It is also possible for the processing section 10 to calculate the gradient of a road on the basis of a value detected from a tilt of the own vehicle, and map data.

As previously described in detail, the processing section 10 corresponds to the vehicle lamp detection device used in the claims. The process in step S120 executed by the processing section 10 corresponds to a gradient calculation section used in the claims. The process in step S140 executed by the processing section 10 corresponds to a light source appearance detection section used in the claims.

Further, the processes in steps S170, S200, and S220 executed by the processing section 10 correspond to a vanishing point estimation section used in the claims. The processes in steps S180, S210, S230 and S270 executed by the processing section 10 correspond to a reliability value calculation section used in the claims. The processes in step S280, S290 and S300 executed by the processing section 10 correspond to a light source detection section used in the claims.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A vehicle light source detection device mounted to an own vehicle configured to detect a light source of a vehicle in captured image data, comprising:
    a light source appearance detection section configured to detect a presence of a light source detected in captured image data;
    a gradient calculation section configured to calculate a gradient of a road on which the own vehicle is running;
    a vanishing point estimation section configured to estimate a vanishing point in the captured image data on the basis of at least the detected gradient of the road;
    a reliability value calculation section configured to more increase a magnitude of a reliability value of the detected light source when a position of the detected light source more approaches to the vanishing point in the captured image data, and the reliability value of the detected light source indicating a possibility that the detected light source is a light source of a vehicle; and
    a light source detection section configured to determine that the detected light source is a light source of a vehicle when the reliability value of the detected light source is not less than a predetermined reference value; wherein
    the light source appearance detection section traces a position of the detected light source in the captured image data, and the reliability value calculation section determines the reliability value of the detected light source on the basis of a gradient of the road on which the own vehicle is running and a moving speed of the detected light source in the captured image data; and
    the reliability value calculation section decreases the reliability value of the detected light source when a moving speed of the detected light source is less than a predetermined lower limit speed of a vehicle, as compared with when a moving speed of the detected light source is not less than the predetermined lower limit speed of the vehicle, and the reliability value calculation section more decreases at least the predetermined lower limit speed of the vehicle when the road on which the own vehicle is running is an uphill road.

2. The vehicle light source detection device according to claim 1, wherein the reliability value calculation section decreases the reliability value of the detected light source when the moving speed of the detected light source exceeds the predetermined upper limit speed of the vehicle, as compared with the reliability value of the detected light source when the moving speed of the detected light source is not more than the predetermined upper limit speed of the vehicle, and
    the reliability value calculation section more increases at least the predetermined upper limit speed of the vehicle when the road on which the own vehicle is running is a downhill road.

3. The vehicle light source detection device according to claim 1, wherein the reliability value calculation section calculates the reliability value of the detected light source on the basis of a gradient of the road on which the own vehicle is running and the moving direction of the detected light source in the captured image data.

4. The vehicle light source detection device according to claim 3, wherein when the road is an uphill road, the reliability value calculation section decreases the reliability value of the detected light source, which indicates a possibility that the detected light source is a light source of a vehicle, when the detected light source moves downward in the captured image data.

5. The vehicle light source detection device according to claim 3, wherein when the road is the uphill road, the reliability value calculation section more increases the reliability value of the detected light source, which indicates a possibility that the detected light source is a light source of a vehicle, when the detected light source moves upward in the captured image data.

6. The vehicle light source detection device according to claim 3, wherein when the road is a downhill road, the reliability value calculation section more increases the reliability value of the detected light source which indicates a possibility that the detected light source is a light source of a vehicle when the detected light source moves downward in the captured image data.

7. The vehicle light source detection device according to claim 3, wherein when the road is a downhill road, the reliability value calculation section more decreases the reliability value of the detected light source which indicates a possibility that the detected light source is a light source of a vehicle when the detected light source moves upward in the captured image data.

8. A light beam control system mounted to the own vehicle controlling an irradiation range of a light beam of head lamps of the own vehicle, comprising:
    the vehicle light source detection device according to claim 1; and
    an irradiation range changing section configured to receive a detection result transmitted from the vehicle light source detection device, and when the detection result of the vehicle light source detection device indicates that the detected light source is a head lamp of a vehicle, the irradiation range changing section configured to change the irradiation range of the light beam of the head lamps of the own vehicle so that the irradiation range of the light beam of the head lamps of the own vehicle is out of the detected light source of the vehicle when the light source of the vehicle is detected.

9. A vehicle light source detection unit comprising:
the vehicle light source detection device according to claim 1;
a memory section configured to store one or more programs for executing the functions of the vehicle light source detection device according to claim 1; and
a central processing unit configured to read the program stored in the memory section and execute the programs.

* * * * *